May 8, 1956 L. B. DAVIS ET AL 2,744,620
SANITARY FLOUR HANDLING SYSTEM
Filed June 14, 1951 4 Sheets-Sheet 1

INVENTORS:
LEWIS B. DAVIS
JOHN B. PAULSEN
BY THEIR ATTORNEYS
HARRIS, KIECH, FOSTER & HARRIS
By

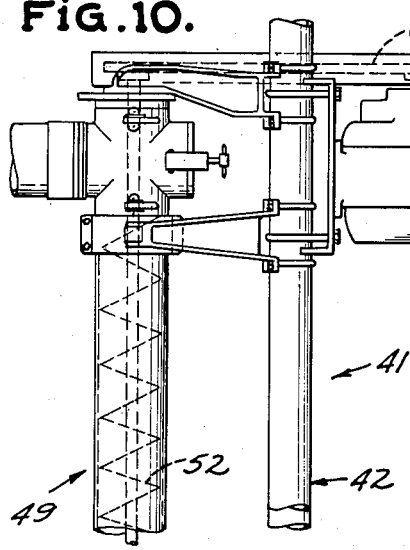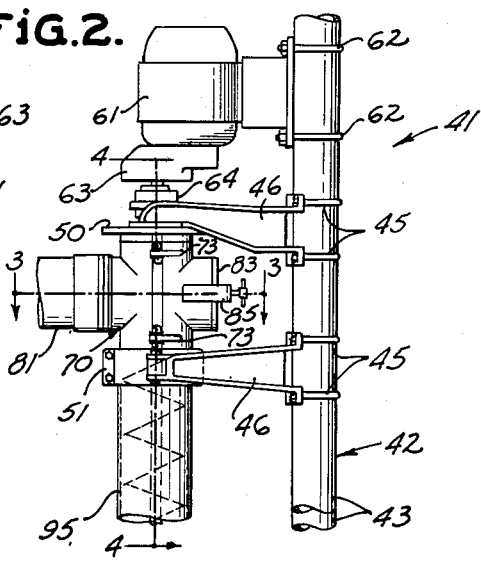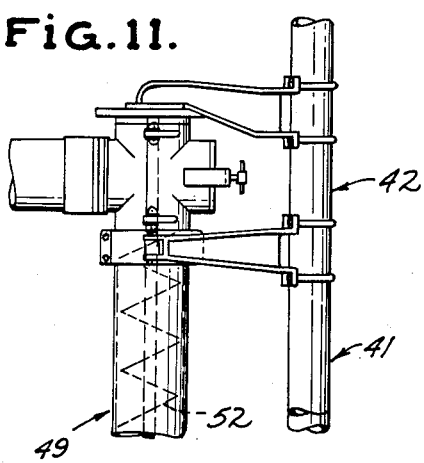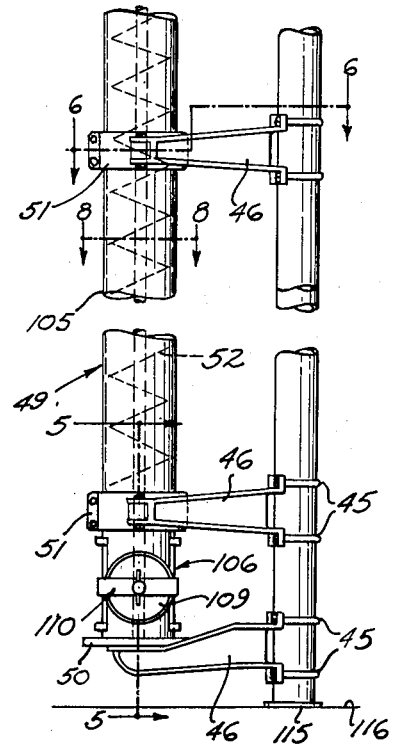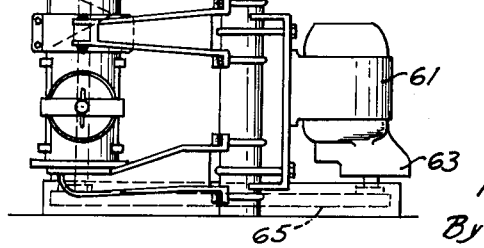

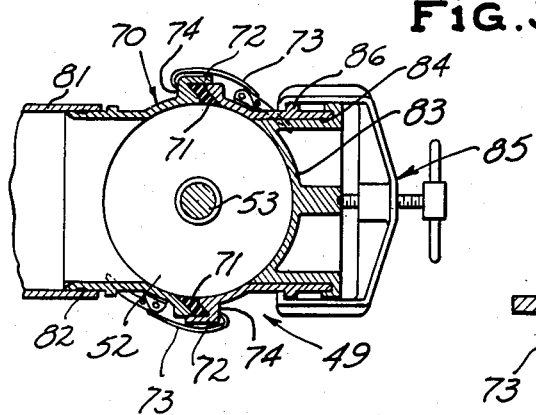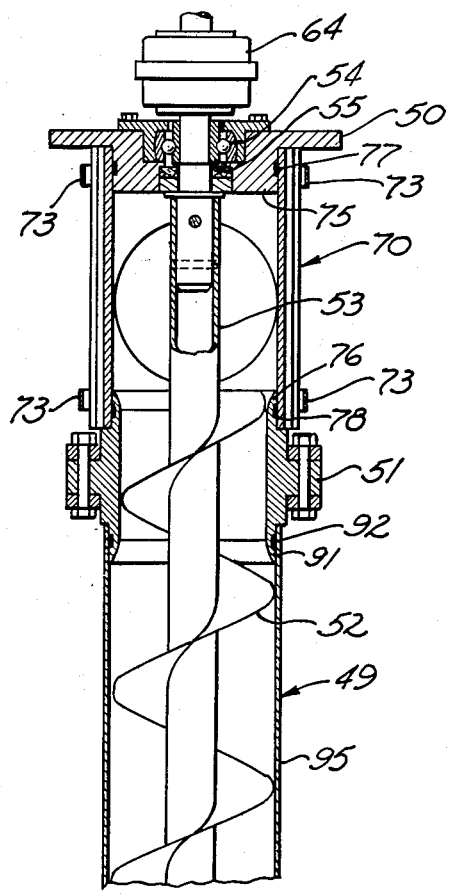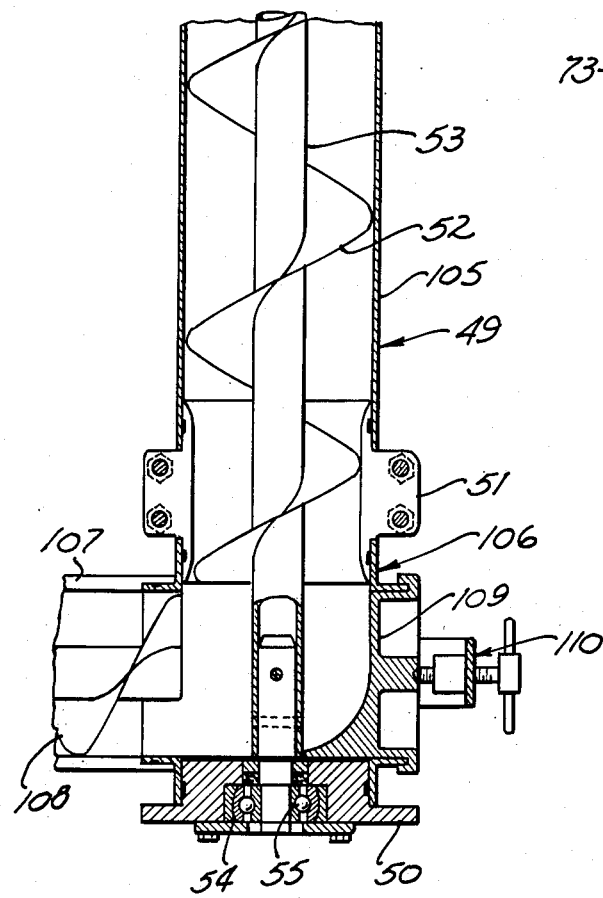

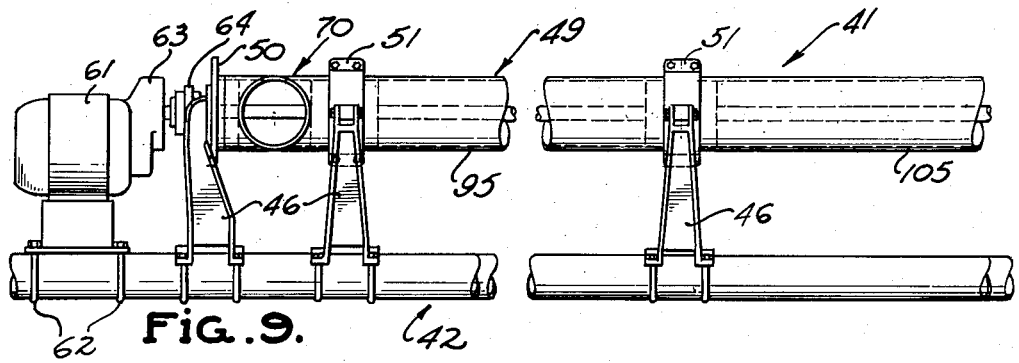
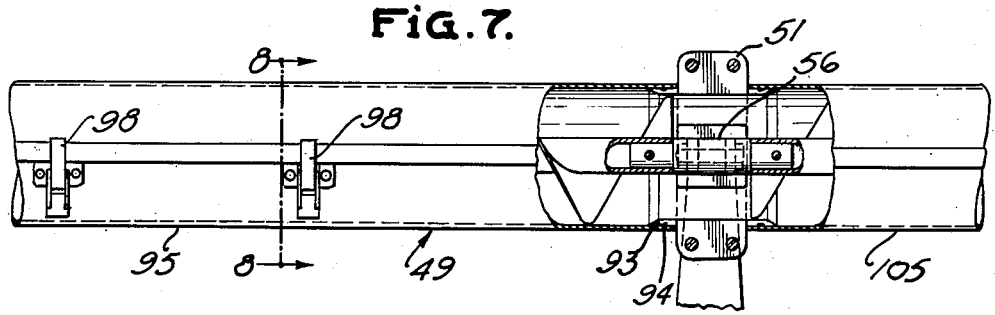
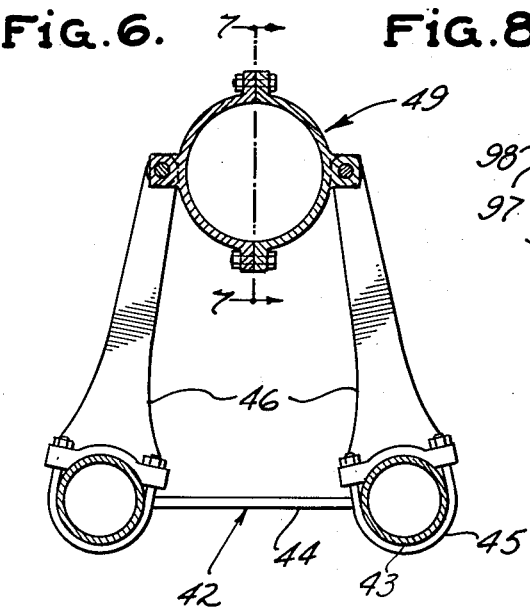
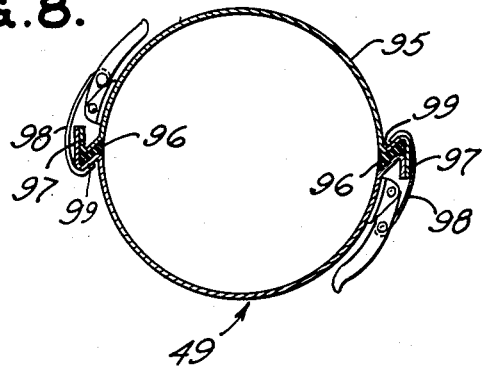

United States Patent Office 2,744,620
Patented May 8, 1956

2,744,620

SANITARY FLOUR HANDLING SYSTEM

Lewis B. Davis, North Hollywood, and John B. Paulsen, Pasadena, Calif., assignors to Read Standard Corporation, a corporation of Delaware Application June 14, 1951, Serial No. 231,516

13 Claims. (Cl. 198—213)

The present invention relates to a material-handling system for conveying materials between various points, and since the invention was originally embodied in and is particularly applicable to a flour-handling system for bakeries, the invention will be considered in such connection herein as a matter of convenience and without limiting the invention thereto since it may be employed for handling materials other than flour.

A primary object of the invention is to provide a system for handling flour, or other materials, which may be completely dismantled readily and in a minimum of time for cleaning, servicing and the like, this being a particularly important advantage of the present invention in bakeries where certain sanitation standards must be met.

More particularly, an object of the invention is to provide a flour-handling system which includes a series of ducts and fittings interconnecting the ducts and in which the ducts and fittings are divided into two or more readily separable parts positively secured together by readily releasable means so that the various parts may be disassembled easily and quickly for cleaning, and the like. A related object is to provide sealing means between the various separable parts which automatically provide flour-tight seals between the parts as they are assembled.

Another object is to provide a flour-handling system which includes tubular conveying means having a series of tubular conveying elements, which may be ducts or fittings, split longitudinally into at least two parts and secured together by readily releasable means, such as toggle clamps. Another object in this connection is to provide supports for the tubular conveying members over which the ends of the tubular conveying members may be telescoped so that the tubular conveying members may be detached from the supports quickly and easily merely by separating the parts of the tubular conveying members from each other. In other words, when the parts of each longitudinally split tubular conveying member are disassembled, they automatically disengage the supports over which the ends thereof are telescoped, which is an important advantage.

Another object is to provide a flour-handling system wherein each tubular conveying means is supported by two end supports with or without one or more intermediate supports, the various supports being axially aligned and being provided with flanges over which the ends of the various tubular conveying members are telescoped when in assembled relation. A related object is to provide a means for conveying the flour through the tubular conveying means which comprises a screw conveyor disposed in the tubular conveying members and extending through tubular intermediate supports if intermediate supports are used, the screw conveyor including a shaft supported by bearings carried by the two end supports. If desired, one or more of the intermediate supports may also be provided with bearing means for the shaft.

Another important object of the invention is to provide a flour-handling system which includes independent flour-handling units which may be inter-connected in any desired manner to convey flour between any two points.

More particularly, an important object of the invention is to provide self-contained units each having the characteristics discussed above and each driven by its own driving means, such as an electric motor operatively connected to the screw conveyor, or other type conveyor, thereof.

Still another important object of the invention is to provide flour-handling units each of which includes a ladder-like frame carrying the tubular conveying means and its supports, the tubular conveying means and the supports therefor being spaced laterally from the ladder-like frame and the axis thereof being substantially parallel to the ladder-like frame, a related object being to provide a construction wherein all of the parts of the tubular conveying members, such as ducts and fittings, and the elements for releasably securing such parts together, are accessible from the ladder-like frame so that an operator on the frame can readily disassemble the elements of the tubular conveying means. With this construction, the ladder-like frame serves both as a means for supporting the various elements of its flour-handling unit, and as a means of access to such elements, which is an important feature of the invention.

Another object is to provide such units for handling flour, or other materials, which may be manufactured in any desired lengths so that various numbers of such units may be combined in various ways to meet the requirements of any installation.

The foregoing objects, advantages and features of the present invention, together with various other objects, advantages and features thereof which will become apparent, may be attained with the exemplary embodiments of the invention which are illustrated in the accompanying drawings and which are described in detail hereinafter. Referring to the drawings:

Fig. 2 is an elevational view of one embodiment of a flour-handling unit of the invention installed in a generally vertical position;

Figure 1:
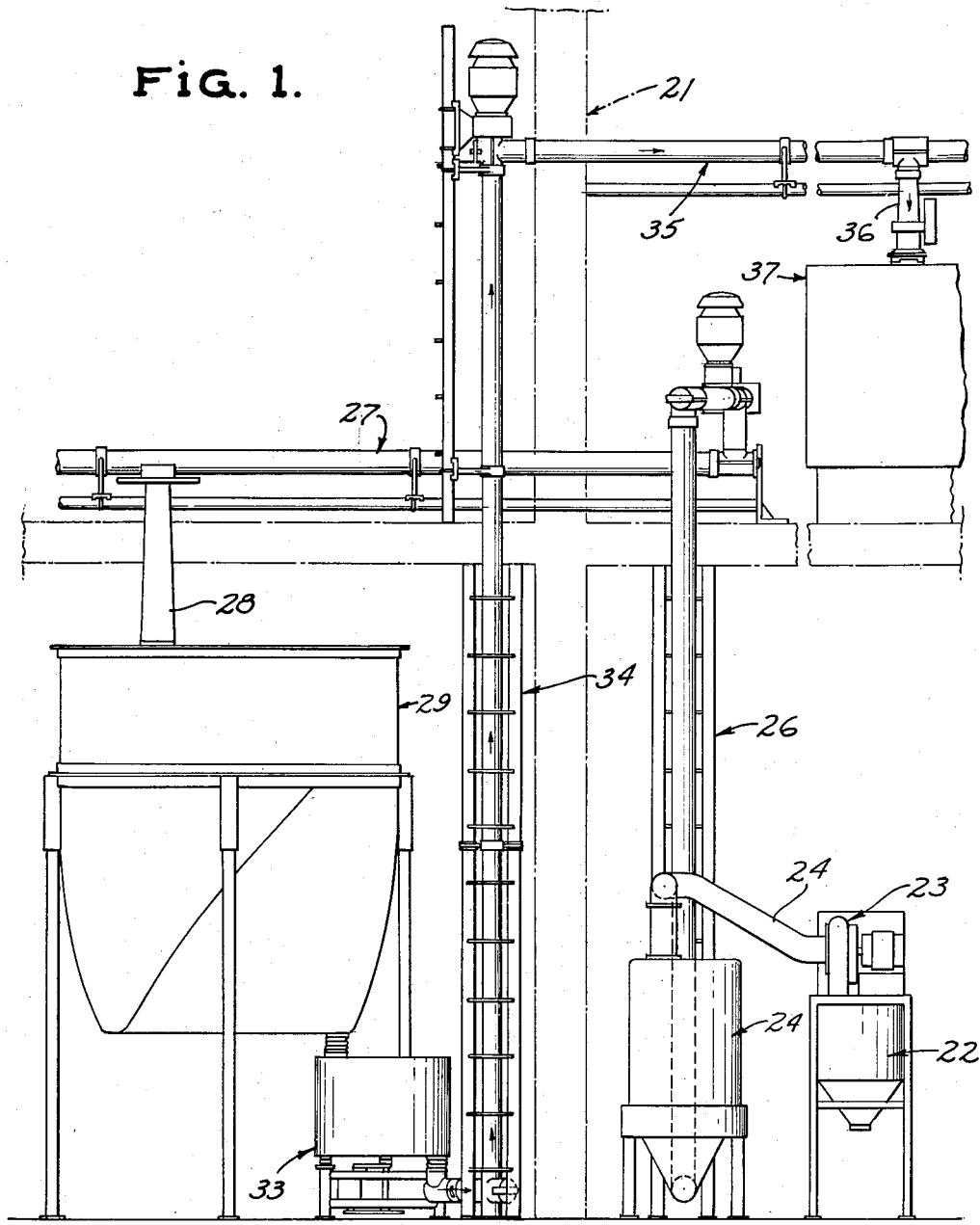
Fig. 1 is a semidiagrammatic, fragmentary elevational view illustrating a typical installation incorporating flour-handling units of the invention, it being understood that the installation illustrated in Fig. 1 is illustrative only and does not exclude other arrangements possible with the invention.

Figs. 3, 4, 5 and 6 are fragmentary sectional views taken as indicated by the arrowed lines 3—3, 4—4, 5—5 and 6—6, respectively, of Fig. 2;

Fig. 7 is a fragmentary sectional view taken as indicated by the arrowed line 7—7 of Fig. 6;

Fig. 8 is a sectional view taken as indicated by the arrowed line 8—8 of Figs. 2 and 7;

Fig. 9 is a fragmentary elevational view illustrating the embodiment of Fig. 2 installed in a generally horizontal position;

Fig. 10 is a fragmentary elevational view of another embodiment of the invention illustrated as installed in a generally vertical position; and Fig. 11 is a fragmentary elevational view of still another embodiment of the invention also illustrated as installed in a generally vertical position.

Referring first to Fig. 1 of the drawings, the numeral 21 designates a fragment of a bakery building in which various apparatuses for handling flour are located. For example, installed in the building 21 may be an apparatus 22 for removing flour from sacks, not shown, and equipped with a blower 23 for delivering the unsacked flour through a duct 24 to a bin 25. From the latter, the flour is conveyed upwardly by a flour-handling unit 26 of the invention which is positioned generally vertically, the unit 26 discharging into a generally horizontally positioned unit 27 which discharges into one or more ducts 28 leading downwardly to one or more storage bins 29, only one duct 28 and one storage bin 29 being shown. From the storage bin 29, the flour is discharged as required into a sifter 33 which, in turn, discharges into a generally vertically positioned flour-handling unit 34 of the invention, the latter conveying the sifted flour upwardly and discharging at its upper end into a generally horizontally positioned unit 35 which discharges into one or more ducts 36 leading downwardly to one or more mixers 37, only one duct 36 and one mixer 37 being shown.

The flour-handling units of the invention, such as the units 26, 27, 34 and 35, may be combined in various ways to convey flour between any two points as dictated by the requirements of a particular installation, the installation of Fig. 1 being illustrative of only one of many possible combinations of such units. It will be noted that the various units may be arranged in various relations with respect to each other. For example, the units may be connected together at angles with respect to each other as shown, or may be connected end to end, not shown, or may be inclined with respect to each other, not shown. Various other possible arrangements will appear to those skilled in the art and it is understood that the invention is not to be regarded as limited to any of the particular arrangements discussed above.

With the foregoing background, various exemplary flour-handling units will now be considered in detail. Various embodiments of such units are illustrated in the drawings, the first being illustrated in Figs. 2 to 8, inclusive.

Referring thereto, the numeral 41 designates a flour-handling unit which includes a ladder-like frame 42 having a pair of spaced, substantially parallel rails 42 interconnected by rungs 44, Fig. 6. The rails 43 are illustrated as formed of pipe in the particular construction shown, and secured thereto by U-clamps 45 at vertically spaced points are pairs of supporting arms 46. The pairs of supporting arms 46 carry axially aligned supports for a tubular conveying means 49 spaced from the frame 42 with its axis substantially parallel thereto, the supports carried by the uppermost and lowermost pairs of supporting arms 46 being designated by the numeral 50 and the supports carried by the intermediate pairs of arms being designated by the numeral 51.

Disposed in the tubular conveying means 49 and extending through the intermediate supports 51 is a screw conveyor 52 in the particular construction illustrated, the intermediate supports being tubular to accommodate the screw conveyor. The internal diameter of the intermediate supports 51 is less than that of the remainder of the tubular conveying means 49 for a reason which will become apparent and the diameter of the screw of the screw conveyor 52 is reduced at the intermediate supports 51 to compensate. The screw conveyor 52 includes a shaft 53 which is mounted in bearings 54 carried by the end supports 50, respectively, grease seals 55 being carried by the end supports 50 adjacent the bearings 54 to prevent the entry of grease into the tubular conveying means 49. If desired, particularly in instances where the tubular conveying means 49 is relatively long, the shaft 53 may be supported in a bearing 56, Fig. 7, carried by one of the intermediate supports 51 in any suitable manner, as by a spider, not shown, connecting the bearing 56 to the corresponding intermediate support. In this instance, it is necessary to interrupt the screw or flight of the screw conveyor 52 at the bearing 56.

The screw conveyor 52 is driven from one end thereof, e. g., the upper end thereof in the particular construction illustrated, by a driving means shown as including an electric motor 61 mounted on the rails 43 of the frame 42 by U-clamps 62. The motor 61 is connected to the upper end of the screw conveyor shaft 53 in the particular construction illustrated through a speed-reducing transmission 63 and a flexible coupling 64. Alternatively, the motor 61 may be connected to the upper end of the screw conveyor shaft 53 through the transmission 63 and a belt 65, as shown in Fig. 10. Also, the motor 61 may be connected to the lower end of the screw conveyor shaft 53 by means of the belt 65 as shown in Fig. 11, or the motor 61 may be connected to the lower end of the conveyor shaft 53 by the means shown in Fig. 2. In all other respects, the embodiments of Figs. 10 and 11 are similar to that of Fig. 2 of the drawings.

Turning now to a detailed consideration of the tubular conveying means 49, at the upper end thereof is a cruciform fitting 70 which is split into two parts longitudinally of the axis of the tubular conveying means as best shown in Fig. 3. The two parts of the cruciform fitting 70 are sealed with respect to each other by longitudinal sealing elements or strips 71 carried in grooves in the respective elements and clamped between the mating edges of the parts. It will be noted that the grooves for the sealing strips 71 are formed in part by longitudinal flanges 72 on the respective parts which overhang the mating edges of the opposite parts, respectively, and tend to maintain the two parts properly oriented with respect to each other. The two parts of the cruciform fitting 70 are releasably secured together by a readily releasable securing means which is illustrated as including toggle clamps 73 carried by the respective parts and adapted to be hooked over ribs 74 on the respective opposite parts.

As best shown in Fig. 4 of the drawings, the upper and lower arms of the cruciform fitting 70, i. e., the longitudinally split arms thereof, are telescoped over flanges 75 and 76, respectively, on the uppermost end support 50 and the uppermost intermediate support 51, respectively, seals between the cruciform fitting 70 and the flanges 75 and 76 being provided by annular sealing elements 77 and 78 carried by the flanges 75 and 76, respectively. It will be apparent that, with this construction, by releasing the toggle clamps 73 the two parts of the cruciform fitting 70 may be separated from each other readily. This automatically disengages the fitting 70 from the corresponding supports 50 and 51 because of the fact that the upper and lower arms of the fitting are telescoped over the flanges 75 and 76, which is an important feature since it makes disassembly of the cruciform fitting 70, for cleaning or the like, a very simple matter.

One of the lateral arms of the cruciform fitting 70 is shown (Fig. 3) as having a generally horizontal duct 81 telescoped thereover and sealed with respect thereto by an annular sealing element 82 carried by such arm. Thus, flour, or other material, conveyed upwardly through the tubular conveying means 49 by the screw conveyor 52 is discharged into the duct 81, the flour being conveyed therethrough in any suitable manner, as by another screw conveyor, not shown. In some instances, the duct 81 may represent a part of another flour-handling unit of the invention similar to the unit 41 under consideration. The other laterally extending arm of the cruciform fitting 70 may be connected to a duct in a similar manner, or, if this is not necessary in the particular installation in which the flour-handling unit 41 is incorporated, such other arm may be closed by a plug 83 telescoped into the arm and having its inner end contoured in alignment with the upper and lower arms of the cruciform fitting. The plug 83 is shown as having a flange 84 which engages the outer end of the corresponding arm of the cruciform fitting 70 to limit insertion thereof, the plug being retained by a screw type clamp 85 hooked over an annular flange 86 on the corresponding arm of the cruciform fitting.

As best shown in Fig. 4 of the drawing, the uppermost intermediate support 51 is provided with a downwardly extending cylindrical flange 91 on the opposite side thereof from the upwardly extending flange 76 thereon, the flange 91 also carrying an annular sealing element, designated by the numeral 92. In a similar manner, the next intermediate support 51 in the series, i. e., the middle intermediate support shown in Fig. 2 of the drawings, is provided with an upwardly extending flange 93, Fig. 7, which carries an annular sealing element 94. Telescoped over the lower flange 91 of the uppermost intermediate support 51 and the upper flange 93 of the next intermediate support and sealed relative thereto by the sealing elements 92 and 94 is a duct 95 of sheet metal, for example. As best shown in Fig. 8, the duct 95 is split longitudinally into two parts, one edge of each part being deformed to provide a groove for a longitudinal sealing element or strip 96. As in the case of the cruciform fitting 70, each groove is formed by a flange 97 which overlies a mating portion of the opposite part of the duct to properly orient the two parts of the duct. The two parts of the duct 95 are releasably secured together by toggle clamps 98 carried by the respective parts of the ducts and hooked over ribs 99 on the respective opposite parts. Thus, by releasing the toggle clamps 98, the two parts of the duct 95 may be separated from each other quickly and easily. Also, because of the fact that the duct 95 is telescoped over the flanges 91 and 93 of the two uppermost intermediate supports 51, the mere act of releasing the toggle clamps 98 automatically detaches the two parts of the duct 95 from the corresponding supports, which is an important feature.

Referring to Fig. 2 of the drawings, between the central one of the intermediate supports 51 and the lowermost of the intermediate supports 51 is another duct 105 which is releasably secured to the corresponding supports in the same manner as the duct 95 so that a detailed description is unnecessary. Depending upon the requirements of a particular installation, the lengths and/or numbers of the ducts 95 and 105 may be varied as required to provide the tubular conveying means 49 with the required over-all length, it being necessary to provide the screw conveyor 52 with a corresponding length. While a two-section conveying means 49, including the two ducts 95 and 105, has been illustrated as a matter of convenience, it will be understood that the number of sections may be increased or decreased as desired.

Referring to Fig. 5 of the drawings, it will be noted that at the lower end of the conveying means 49 we have provided another cruciform fitting 106 which is substantially identical to the cruciform fitting 70 so a detailed description is not necessary, it being sufficient to say that the fitting 106 is also split longitudinally into two parts for ready disassembly. One of the horizontal arms of the cruciform fitting 106 has telescoped thereover a duct 107 through which flour is delivered into the tubular conveying means 49 in any suitable manner, as by a screw 108. For example, the duct 107 and the screw 108 may form part of another flour-handling unit similar to the unit 41 under consideration. If desired, the other lateral or horizontal arm of the cruciform fitting may have a duct, not shown, connected thereto in a similar manner in the event it is desired to feed flour from two sources to the tubular conveying means 49. However, in the particular construction illustrated, the opposite lateral arm of the cruciform fitting 106 is closed by a plug 109 which is similar to the previously described plug 83, except that it is contoured at its inner end to provide an elbow, and which is releasably secured in place in the same manner by a screw type clamp 110.

In Figs. 2 to 8 of the drawings, the flour-handling unit 41 has been shown in a generally vertical position, as is the case with the alternative or modified embodiments of Figs. 10 and 11 discussed previously. In Fig. 9 of the drawings, the unit 41 is shown positioned horizontally to convey flour or other materials horizontally from one point to another. It will be understood, however, that the unit 41 may be positioned at any desired angle, the same being true of the modifications of Figs. 10 and 11 of the drawings.

Considering various important features of the invention in the light of the preceding detailed description, it will be apparent that the flour-handling unit 41, or the modifications thereof illustrated in Figs. 10 and 11, may be employed in various positions and in various combinations with other, similar units to convey flour between any two desired points in a bakery, the numbers, lengths and positions of such units depending upon the requirements of the particular installation. Thus, it will be seen that by providing self-contained units, the present invention provides a very flexible way of transporting flour from one point to another since it is merely necessary to set up and connect units of the lengths and in the numbers and positions required by a particular installation.

It will be understood that the unit 41 may be supported in any desired position by suitable supports connected to the frame 42 thereof. For example, as indicated in Fig. 2, the rails 43 of the frame 42 may be provided with feet 115 adapted to rest on a floor 116, or the like. Also, as suggested by the flour-handling unit 34 shown in Fig. 1 of the drawings, the frame 42 of the unit 41 is not necessarily continuous. In the case of the unit 34 shown in Fig. 1, the frame is divided into two parts, one part extending from the lower floor to the second floor of the building 21, and the other part extending upwardly from the second floor and supporting the upper end of the conveyor means. If desired, the unit 34 of Fig. 1 may be regarded as comprising two of the units 41 connected end to end and omitting the electric drive motor 61 of one of the units.

Another important feature of the invention is that the ladder-like frame 42 of the unit 41 provides ready access to all of the elements of the unit, such as the various clamps for holding the various separable parts together. Thus, a workman, by going up and down on the ladder-like frame 42 when the unit is positioned vertically, or by moving horizontally therealong if the unit is positioned horizontally, has ready access to all of the removable parts so that disassembly of the various ducts and fittings for cleaning, maintenance, or the like, is a simple matter which may be accomplished in a minimum of time. Thus, as will be apparent, the various ducts and fittings may readily be assembled and disassembled, the provision of the ladder-like frame 42 contributing materially to this, which is an important feature.

Although we have disclosed exemplary embodiments of our invention herein and have suggested exemplary applications thereof, it will be understood that the invention is susceptible of other applications and that various changes, modifications and substitutions may be incorporated in the embodiments disclosed without departing from the spirit of the invention.

We claim as our invention:

1. In a material-handling system, the combination of: a frame; a support carried by said frame and provided with a cylindrical flange; a tubular conveying member having a cylindrical end telescoped over and being in circumferential engagement with said cylindrical flange, said tubular conveying member being split longitudinally into a plurality of parts so that it may be detached from said support readily by separating said parts thereof from each other; readily releasable means for securing said parts of said tubular conveying member together; annular sealing means between said cylindrical flange and said end of said tubular conveying member and longitudinal sealing means between said parts of said tubular conveying member.

2. A material-handling system according to claim 1 wherein said readily releasable means includes toggle clamps carried by one of said parts of said tubular conveying member and engageable with the other.

3. In a material-handling system, the combination of: an elongated frame; a pair of aligned supports carried by and spaced laterally from said frame, said supports respectively being provided with cylindrical flanges which are axially aligned with respect to each other; a cylindrical conveyor duct having its ends respectively telescoped over said cylindrical flanges, said elongated frame being parallel to the axis of said duct and said cylindrical flanges being of ladder-like construction, said duct being split longitudinally into a plurality of parts so that said duct may be detached from said supports readily by separating said parts thereof from each other; and readily releasable means for securing said parts of said duct together.

4. A material-handling system according to claim 3 wherein said frame includes a pair of substantially parallel rails and a plurality of rungs interconnecting said rails.

5. In a material-handling system, the combination of: a ladder-like frame; tubular conveying means including longitudinally separable parts carried by and spaced laterally from said ladder-like frame with its axis substantially parallel to said frame; readily releasable means carried by said tubular conveying means and accessible from said ladder-like frame for securing said parts together; and means for conveying a material through said tubular conveying means.

6. A material-handling system as defined in claim 5 wherein said tubular conveying means includes a plurality of tubular conveying members each split longitudinally into a plurality of parts, said system also including a plurality of aligned supports carried by and spaced laterally from said ladder-like frame and equal in number to the number of tubular conveying members plus one, two of said supports being disposed at the respective ends of said tubular conveying means and respectively including flanges aligned with the axis of said tubular conveying means, the supports intermediate said two end supports being tubular and each being provided with a pair of flanges on opposite sides thereof and aligned with said axis of said tubular conveying means, the ends of said tubular conveying members being telescoped over said flanges, respectively, and said tubular conveying members being readily detachable from said supports by separating said parts thereof from each other.

7. A material-handling system according to claim 6 including a plurality of annular sealing means respectively disposed between the ends of said tubular conveying members and said flanges, and including a plurality of longitudinal sealing means respectively disposed between the parts of said tubular conveying members.

8. A material-handling system as defined in claim 5 wherein said tubular conveying means includes a plurality of tubular conveying members each split longitudinally into a plurality of parts, said system also including a plurality of aligned supports carried by and spaced laterally from said ladder-like frame and equal in number to the number of tubular conveying members plus one, two of said supports being disposed at the respective ends of said tubular conveying means and respectively including flanges aligned with the axis of said tubular conveying means, the supports intermediate said two end supports being tubular and each being provided with a pair of flanges on opposite sides thereof and aligned with said axis of said tubular conveying means, the ends of said tubular conveying members being telescoped over said flanges, respectively, and said tubular conveying members being readily detachable from said supports by separating said parts thereof from each other, the means defined in claim 5 for conveying a material through said tubular conveying means including a screw conveyor disposed in said tubular conveying members and said tubular intermediate supports and providing a shaft extending into said two end supports, each of said two end supports carrying bearing means for and engaging said shaft.

9. In a material-handling unit adapted to be connected to similar material handling units to provide a material-handling system, the combination of: a ladder-like frame; tubular conveying means carried by said ladder-like frame and spaced laterally therefrom with its axis substantially parallel to said ladder-like frame, said tubular conveying means including tubular conveying members each split longitudinally into a plurality of parts; supporting means for said tubular conveying means including aligned supports having flanges aligned with the axis of said tubular conveying means and over which the ends of said tubular conveying members are telescoped; readily releasable means for securing said parts of said tubular conveying members together so that said parts may be detached from said supports readily by separating them from each other, two of said supports being located at the respective ends of said tubular conveying means and the supports intermediate said two end supports being tubular; a screw conveyor disposed in said tubular conveying members and extending through said tubular intermediate supports, said screw conveyor including a shaft; bearing means for said shaft carried by said two end supports, respectively, and engaging said shaft; and drive means for said screw conveyor carried by said ladder-like frame and operatively connected to said shaft.

10. A material-handling unit as defined in claim 9 wherein said drive means includes an electric motor carried by said ladder-like frame and operatively connected to said shaft to rotate said screw conveyor.

11. In a material-handling system, the combination of: a pair of material handling units each of which includes a ladder-like frame, tubular conveying means carried by and spaced laterally from said frame with its axis substantially parallel to said frame, and means carried by said frame for conveying a material through said tubular conveying means, said tubular conveying means of each of said units including a plurality of longitudinally separable parts and including readily releasable means accessible from said ladder-like frame thereof for securing said parts together; and means for connecting an end of one of said tubular conveying means to an end of the other.

12. A material-handling system according to claim 11 wherein said tubular conveying means are positioned with their axes at an angle.

13. A material-handling system according to claim 11 wherein the tubular conveying means of each of said material handling units includes at least two tubular conveying members split longitudinally into a plurality of parts, and wherein each of said material handling units includes axially aligned supports over which the ends of said tubular conveying members are telescoped, respectively, said readily releasable means including means for releasably securing the parts of each of said tubular conveying members together so that said tubular conveying members may be readily detached from said supports by separating said parts thereof from each other.

References Cited in the file of this patent

UNITED STATES PATENTS

| | | |
|---|---|---|
| 665,262 | Peck | Jan. 1, 1901 |
| 1,045,359 | Babbitt | Nov. 26, 1912 |
| 1,785,604 | Tellefsen | Dec. 16, 1930 |
| 2,360,776 | Kozak et al. | Oct. 17, 1944 |
| 2,364,353 | Escher | Dec. 5, 1944 |
| 2,424,810 | Escher | July 29, 1947 |
| 2,482,558 | Scaringella | Sept. 20, 1949 |
| 2,587,854 | Johnson | Mar. 4, 1952 |

FOREIGN PATENTS

| | | |
|---|---|---|
| 20,324 | Great Britain | Sept. 18, 1902 |
| 18,514 | Great Britain | Aug. 5, 1910 |
| 459,851 | Great Britain | Jan. 12, 1937 |